US009652232B2

(12) United States Patent
Goettfert et al.

(10) Patent No.: US 9,652,232 B2
(45) Date of Patent: May 16, 2017

(54) DATA PROCESSING ARRANGEMENT AND METHOD FOR DATA PROCESSING

(71) Applicant: Infineon Technologies AG, Neubiberg (DE)

(72) Inventors: Rainer Goettfert, Putzbrunn (DE); Berndt Gammel, Markt-Schwaben (DE); Gerd Dirscherl, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 311 days.

(21) Appl. No.: 14/341,925

(22) Filed: Jul. 28, 2014

(65) Prior Publication Data

US 2015/0032992 A1 Jan. 29, 2015

(30) Foreign Application Priority Data

Jul. 29, 2013 (DE) .................. 10 2013 108 073

(51) Int. Cl.
   *G06F 9/30* (2006.01)
   *G06F 9/38* (2006.01)
   *G06F 21/85* (2013.01)

(52) U.S. Cl.
   CPC .......... *G06F 9/3004* (2013.01); *G06F 9/3885* (2013.01); *G06F 21/85* (2013.01)

(58) Field of Classification Search
   None
   See application file for complete search history.

(56) References Cited

U.S. PATENT DOCUMENTS 5,822,762 A * 10/1998 Nishida ............... G06F 12/0888
  711/139
6,000,013 A * 12/1999 Lau .................... G06F 12/0893
  711/118

(Continued)

FOREIGN PATENT DOCUMENTS

DE 102004062825 A1 7/2006

OTHER PUBLICATIONS

Office Action issued in the corresponding German Application No. 10 2013 108 073.1 dated Jun. 4, 2014.

(Continued)

*Primary Examiner* — Kaveh Abrishamkar
(74) *Attorney, Agent, or Firm* — Viering, Jentschura & Partner mbB

(57) ABSTRACT

A processing arrangement having a first processing component and a second processing component is provided. The first component has a first output memory and a second output memory and a control device using the first memory storing a value to be output and the second memory stores a value that is based according to a prescribed function on the value. The control device stores a new value in the first memory whenever the second component has read a value stored in the first memory. The second component has a reading device reading the values stored in the first and second memories, and a processing device that checks whether the value read from the second memory is based according to the prescribed function on the value read from the first memory and, depending on the result, to process the value read from the first memory.

18 Claims, 4 Drawing Sheets

(56) References Cited

U.S. PATENT DOCUMENTS

| | | | |
|---|---|---|---|
| 7,010,607 B1* | 3/2006 | Bunton | H04L 1/24 |
| | | | 709/228 |
| 7,694,156 B2 | 4/2010 | Gammel et al. | |
| 9,032,273 B2* | 5/2015 | Otterstedt | G06F 11/1068 |
| | | | 714/773 |
| 9,147,086 B1* | 9/2015 | Potlapally | G06F 21/57 |
| 2007/0033417 A1* | 2/2007 | Gammel | G06F 21/72 |
| | | | 713/189 |
| 2007/0189536 A1* | 8/2007 | Gammel | H04L 9/004 |
| | | | 380/259 |
| 2011/0145919 A1* | 6/2011 | Whelihan | G06F 21/57 |
| | | | 726/22 |
| 2014/0115314 A1* | 4/2014 | Huang | G06F 21/575 |
| | | | 713/2 |
| 2014/0379770 A1* | 12/2014 | Guillemin | G06F 9/30021 |
| | | | 708/236 |

OTHER PUBLICATIONS

Technical Report on Basic I/O Hardware Addressing, C++perfromance group Draft, WG14 N910 (J16/00-0010=WG21 N1233), pp. 1-18printed out Jul. 29, 2014.

\* cited by examiner

DATA PROCESSING ARRANGEMENT AND METHOD FOR DATA PROCESSING

CROSS-REFERENCE TO RELATED APPLICATION

This application claims priority to German Patent Application Serial No. 10 2013 108 073.1, which was filed Jul. 29, 2013, and is incorporated herein by reference in its entirety.

TECHNICAL FIELD

Various embodiments relate generally to data processing arrangements and methods for data processing.

BACKGROUND

In a data processing system, it may be necessary for the data transfer from a component of the data processing system, e.g. from a peripheral unit (PER), to a processor unit (e.g. the CPU) or vice versa to be protected against physical attacks. By way of example, the data processing system for processing security-critical data may be a chip card that is used for secure authentication or for secure payment operations, or a security controller, what is also known as a "secure element", in a mobile telephone, a personal computer, an automobile, a gaming console or an industrial controller. This is simply called a "security controller" below.

In the case of read or write access, e.g. from a CPU to a peripheral unit, this typically involves the CPU transmitting an address on a bus (e.g. a dedicated address bus) and hence selecting a desired register (R) of the peripheral unit. A bus (e.g. a dedicated data bus) is then typically used to transmit the data that are to be transmitted from/to the peripheral unit.

In a manipulative attack, an attacker could temporarily change address bits on the address bus, so that a different register in a different peripheral unit is addressed. In that case, the data would be transmitted from/to this peripheral unit instead of from/to the desired peripheral unit. On the other hand, the attack could corrupt the transmitted data. In both cases, this may compromise the security of the system.

SUMMARY

A processing arrangement having a first processing component and a second processing component is provided. The first component has a first output memory and a second output memory and a control device using the first memory storing a value to be output and the second memory stores a value that is based according to a prescribed function on the value. The control device stores a new value in the first memory whenever the second component has read a value stored in the first memory. The second component has a reading device reading the values stored in the first and second memories, and a processing device that checks whether the value read from the second memory is based according to the prescribed function on the value read from the first memory and, depending on the result, to process the value read from the first memory.

Furthermore, a method for data processing according to the data processing arrangement described above is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced. These embodiments are described in such detail that a person skilled in the art can implement the invention. Other embodiments are also possible and the exemplary embodiments can be modified in structural, logical and electrical respects without departing from the subject of the invention. The various embodiments are not necessarily mutually exclusive but rather it is possible for various embodiments to be combined with one another, so that new embodiments are produced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Figure 1:
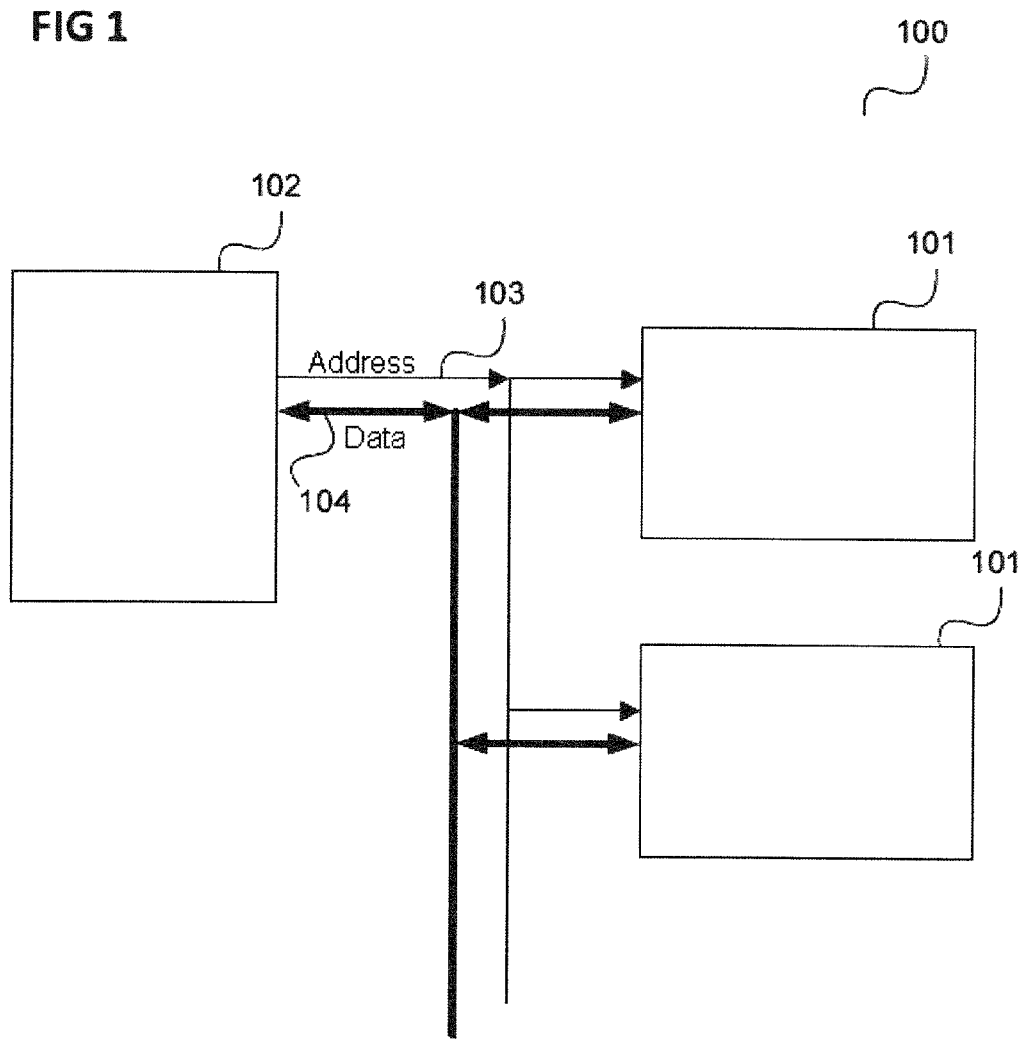
FIG. 1 shows a data processing arrangement in the case of which a data processing component uses a bus to access a plurality of further data processing components.

FIG. 1 shows a data processing arrangement 100 according to an embodiment.

The data processing arrangement 100 has one or more first data processing components 101, for example peripheral units, and a second data processing component 102 (e.g. a processor, for example a CPU). The first data processing components 101 are connected to the second data processing component 102 by means of an address bus 103 and by means of a data bus. By transmitting an address by means of the address bus 103, the second data processing component 102 can address a first data processing component 101 or a register of a first data processing component 101, and by means of the data bus 104 it can transmit data that are to be transmitted to the addressed data processing component or the addressed register or can read data that are to be transmitted from the addressed data processing component or from the addressed register.

The data bus 104 and the address bus 103 may also be identical. For the selection of a first data processing component 101 or of a register of a first data processing component 101, it is also possible to use a dedicated select signal that is activated by an address decoder in the CPU (this corresponds to what is known as one-hot coding) instead of an address bus.

In order to protect the data processing arrangement 100 against attacks that involve address bits on the address bus 103 being changed, it is possible to introduce information redundancy. By way of example, the data that are to be transmitted can be used to transmit a signature in the form of an error recognition code on the data bus 104 (in which case it is also possible for code to be understood to mean a simple duplication of the data that are to be transmitted). This is complex, however, since it requires an increased effective word length of the data transfers (i.e. a wider data bus).

In addition, it is also possible to use temporal redundancy to protect against attacks. By way of example, in the case of read access, this involves the second data processing component 102, e.g. a CPU, reading values twice (or repeatedly) in succession from a second first data processing component 101, e.g. a peripheral unit, and checking the read values for identity (check reading). In the case of write access, the CPU can write twice (check writing), for example, or can write and then read back in order to check whether the correct value has arrived and been written at the peripheral unit. If it is assumed that the attacker produces only temporary errors and is incapable of inserting the same error during check reading or check writing, there is a high level of certainty that the attack can be recognized. If the attacker can produce permanent errors, however, additional measures are necessary, a "permanent error" being understood to mean that the attacker impresses the same error over a plurality of data transfers.

In comparison with the use of information redundancy, the use of temporal redundancy allows lower costs for the hardware and scalability and flexibility in the software (e.g. repeated reading, variable times for the reading).

However, temporal redundancy cannot be used in the form of check reading from a register that has previously been read or written to for a register of a peripheral unit in the case of which the reading of a register triggers a state change. By way of example, in the case of a random number generator, a new random number would appear in R for every check reading, provided that the reading of a value initiates the generation of the next value and the check reading would fail. Peripheral units, or generally data processing components, in which the reading from an output register prompts a new output value to be stored in the output register are also called SCPRs (state-changing peripheral registers) below.

According to an embodiment, a data processing arrangement is provided in which protection against attacks is used that can also be used for a SCPR. In the text that follows, a data processing arrangement having a first data processing component and a second data processing component will be described in more detail.

Figure 2:
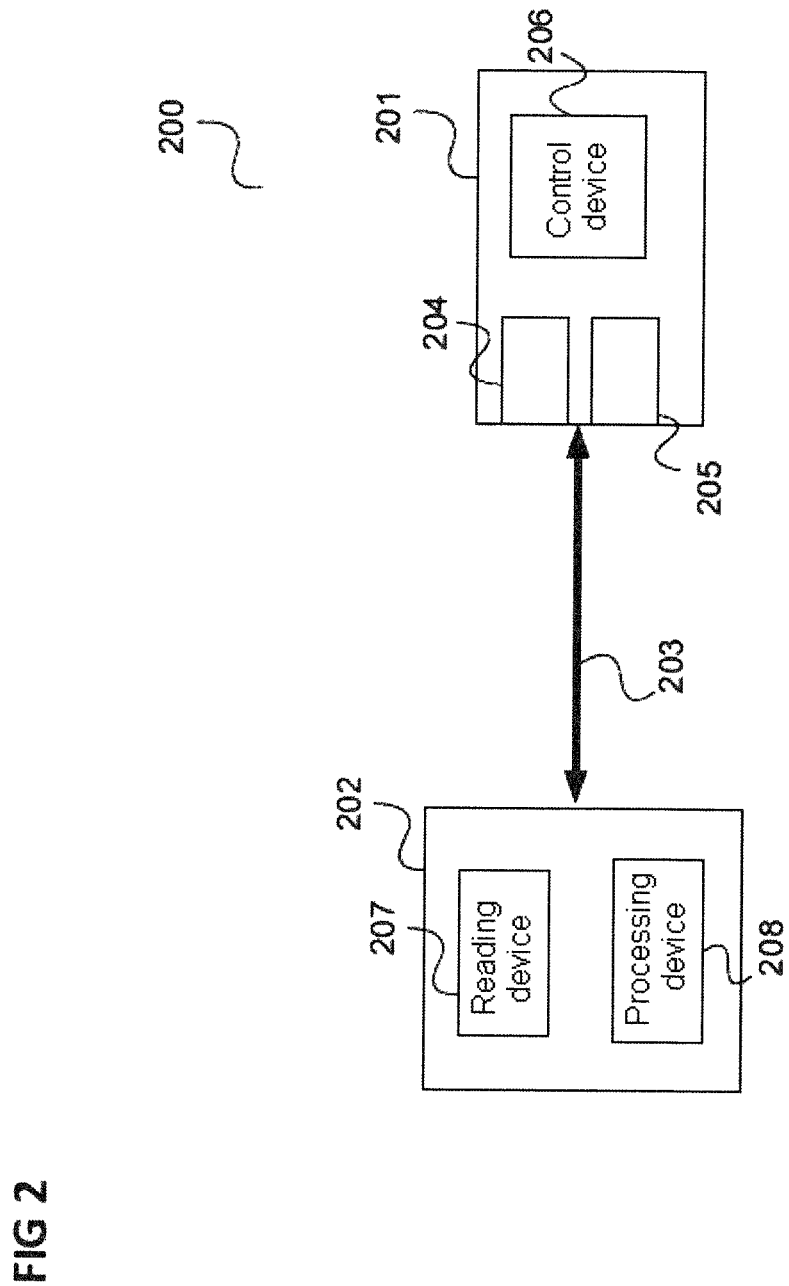
FIG. 2 shows a data processing arrangement in the case of which a data processing component that is read contains, for an output memory element, a further output memory element that allows the reading component to detect security-critical operations.

FIG. 2 shows a data processing arrangement 200 according to various embodiments.

The data processing arrangement 200 has a first data processing component 201 and a second data processing component 202 that are connected by means of a communication link 203.

The first data processing component 201 has a first data output memory element 204 and a second data output memory element 205 and a control device 206 that is set up to use the first data output memory element 204 to store a value that is to be output and to use the second data output memory element 205 to store a value that is based according to a prescribed function on the value that is to be output, wherein the control device 206 is set up to store a new value that is to be output in the first data output memory element 204 whenever the second data processing component 202 has read a value to be output that is stored in the first data output memory element 204.

The second data processing component 205 has a reading device 207 that is set up to read the value stored in the first data output memory element 204 and the value stored in the second data output memory element 205 by means of the communication link 203.

In addition, the second data processing component 205 has a processing device 208 that is set up to check whether the value read from the second data output memory element 205 is based according to the prescribed function on the value read from the first data output memory element and, depending on whether the value read from the second data output memory element is based according to the prescribed function on the value read from the first data output memory element, to process the value read from the first data output memory element.

In other words, according to an embodiment, an SCPR contains, in addition to a first output element (e.g. a first output register), a second output element (e.g. a second output register) that stores a value that is based on the value to be output that is stored in the first output element, and the reading component reads the value from the first output element and the value from the second output element and uses the two values to establish whether the value stored from the first output element needs to be processed. If the reading component establishes that the value read from the second output element is not based in the prescribed manner on the value read from the first output element, for example, it assumes that an undesirable operation (for example an attack or unauthorized or undesirable access) has occurred and rejects the value read from the first output element, for example.

The function is the identity, for example.

According to an embodiment, the function is a reversible transformation.

The function may also be a hash function.

The prescribed function is dependent on a nonce, for example. By way of example, the control device changes the nonce regularly, e.g. whenever a value that is stored in the second data output memory element has been produced.

By way of example, the processing device is set up to reject the value read from the first data output memory element if the value read from the second data output memory element is not based according to the prescribed function on the value read from the first data output memory element.

By way of example, the reading device is set up to read a new value from the first data processing element if the value read from the second data output memory element is not based according to the prescribed function on the value read from the first data output memory element.

According to various embodiments, the control device is set up to store a prescribed signal value in the second data output memory element when the value stored in the second data output memory element has been read. By way of example, the prescribed signal value may be independent of the value that is to be output (but may be dependent on a nonce, for example).

According to various embodiments, the control device is set up to store a prescribed signal value in a further data output memory element when the value stored in the second data output memory element has been read, wherein the reading device is set up to read the value stored in the further data output memory element and wherein the processing device is set up to check whether the further data output memory element stores the prescribed signal value and, depending on whether the further data output memory element stores the prescribed signal value, to process the value read from the first data output memory element. By way of example, the prescribed signal value is independent of the value that is to be output (but may be dependent on a nonce, for example).

By way of example, the processing device is set up to reject the value read from the first data output memory element if the further data output memory element stores the prescribed signal value.

The first data processing component is a CPU, for example.

The second data processing component is a peripheral unit, for example.

According to an embodiment, the second data processing component is a random number generator.

By way of example, the data processing arrangement is arranged in a security controller, for example on a chipcard, e.g. in a chipcard module of the chipcard, that is used for secure authentication or for secure payment operations, or in a security controller, what is known as a "secure element", in a mobile telephone, a personal computer, an automobile, a gaming console or an industrial controller.

The data output memory elements are output registers, for example.

The communication link is a (computer) bus, for example.

By way of example, the communication link has an address bus and a data bus.

The components of the data processing arrangement 200 (such as the control device and the processing device) are implemented by one or more circuits, for example. In various embodiments, a "circuit" is intended to be understood to mean any unit that implements logic, and that may be hardware, software, firmware or a combination thereof. Hence, in various embodiments, a "circuit" may be a hardwired logic circuit or a programmable logic circuit, such as a programmable processor. A "circuit" may also be intended to be understood to mean a processor that executes software, e.g. any type of computer program. In an embodiment, a "circuit" may be intended to be understood to mean any type of implementation of the functions described below.

Figure 3:
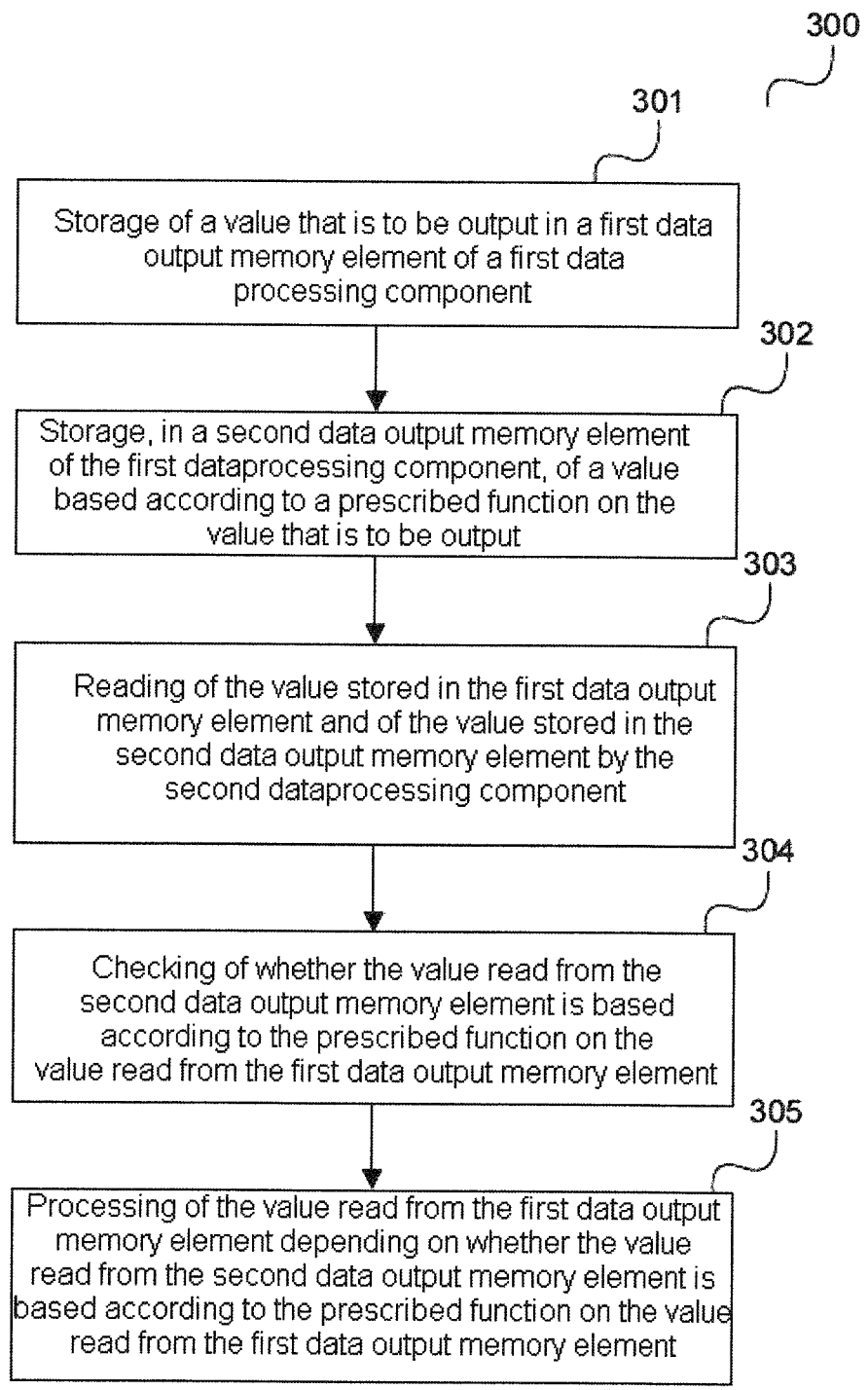
FIG. 3 shows a flowchart that illustrates a method for data processing.

By way of example, the data processing arrangement 200 executes a method as shown in FIG. 3.

FIG. 3 shows a flowchart 300 according to an embodiment.

The flowchart 300 illustrates a method for data processing.

In 301, a value that is to be output is stored in a first data output memory element of a first data processing component.

In 302, a second data output memory element of the first data processing component is used to store a value that is based according to a prescribed function on the value that is to be output.

In 303, a second data processing component reads the value that is stored in the first data output memory element and the value that is stored in the second data output memory element.

The first data processing arrangement stores a new value that is to be output in the first data output memory element whenever the second data processing component has read a value to be output that is stored in the first data output memory element.

In 304, a check is performed to determine whether the value read from the second data output memory element is based according to the prescribed function on the value read from the first data output memory element.

In 305, the value read from the first data output memory element is processed depending on whether the value read from the second data output memory element is based according to the prescribed function on the value read from the first data output memory element.

Embodiments that are described in connection with the data processing arrangement 200 apply in similar fashion to the method for data processing, and vice versa.

An embodiment is described in greater detail below.

Figure 4:
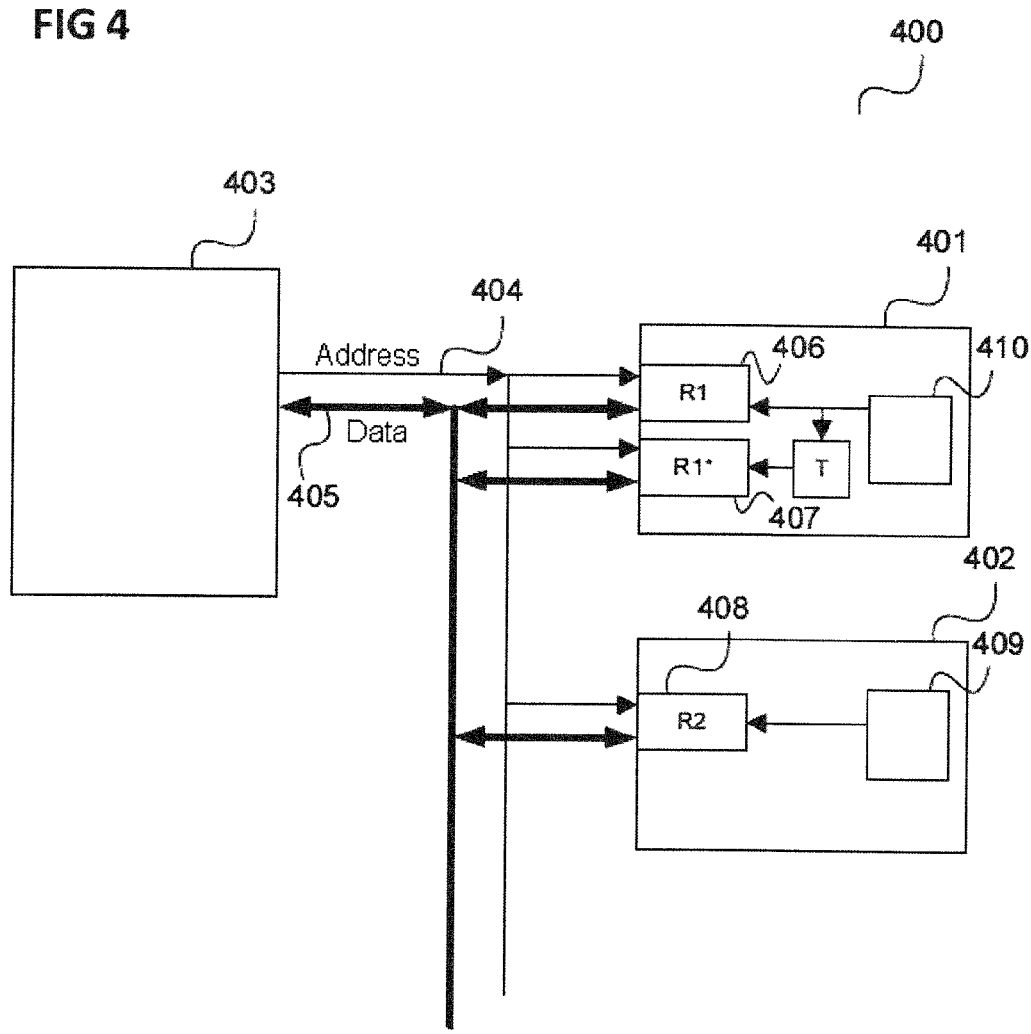
FIG. 4 shows a data processing arrangement according to various embodiments in greater detail.

FIG. 4 shows a data processing arrangement 400 according to an embodiment.

The data processing arrangement 400 has a plurality of first data processing components 401, 402, in this case a first peripheral unit 401 and a second peripheral unit 402. In addition, the data processing arrangement 400 has a second data processing component 403, in this example a CPU 403. The first data processing components 401, 402 and the second data processing component 403 are coupled by means of an address bus 404 and by means of a data bus 405, as described above with reference to FIG. 1, with the first peripheral unit 401 having a first output register 406 (R1) and a second output register 407 (R1*) that can be individually accessed by means of the address bus 404 and the data bus 405, i.e. they can both be addressed by means of the address bus and from which the value stored therein can be read by means of the data bus 405 in each case.

In this example, it is assumed that the first peripheral unit 401 is an SCPR. In this example, the second peripheral unit 402 is not an SCPR and it has an output register 408 that a processor unit 409 of the second peripheral unit 402 can use to store an output value.

For each SCPR, in this example the first peripheral unit 401, a check register, in this case the second output register 407, is provided in addition to the output register 406.

According to an embodiment, a processor unit 410 of the first peripheral unit 401 stores the same value in said second output register as in the first output register 406.

By way of example, the CPU 403 reads the value stored in the first output register 406, and then reads the value stored in the second output register 407 and compares the read values in order to establish whether the first output register 406 has been read correctly. When the first output register 406 has been read, the first peripheral unit 401 can already perform a state change for the first output register 406, i.e. can store a new output value therein. In this case, the value stored in the second output register 407 is the same as the value most recently read from the first output register 406.

To ensure security in the attack model with permanent errors, it is possible for the value, before being stored in the second output register 407, to be altered by a transformation element according to a transformation T, so that the value that is stored in the second output register 407 is a function of the value that is stored in the first output register 406.

By way of example, the transformation is in a form such that the CPU 403 can easily reverse the transformation (i.e. can easily perform the relevant reverse transformation) so that, by comparing the value obtained by the reverse transformation with the value read from the first output element 406, it is possible to establish whether the value has been read from the first output register correctly. Alternatively, instead of an easily reversible transformation, it is possible to use an irreversible function, e.g. a hash function or a cryptographic one-way hash function H, and the CPU 403 compares the value read from the second output register 407 with the value read from the first output register, to which value it has applied the function H.

According to an embodiment, the following additional mechanism is used for a practical processor system. This allows asynchronous interruptability of programs (tasks) to be supported in the case of interrupts and multitasking. This embodiment involves the consideration that a first program (TASK1) can be briefly interrupted at any point by a second program so as then to be continued again at the same point. It is assumed that the second program (TASK2) also has access to the first peripheral unit 401, i.e. the SCPR (otherwise it is possible to dispense with the additional mechanism).

By way of example, the first peripheral unit 401 is a random number generator. Whenever the first output register 406 is read, a new random number is output, i.e. stored in the first output register 406. If the first program is interrupted by the second program between the reading of the first output register 406 and the second output register 407, the second program would be able to read from the second output register 407 the random number that the first program has read without the first program noticing this as soon as it is continued. Depending on what the random number is used for, this may be a security loophole.

To avoid this, this embodiment involves the use of the following additional mechanism: the information that the second output register has been read is signaled to the CPU 403 by the first peripheral unit 401. This can be accomplished by virtue of the second output register always being set to a specific signaling value (SIG) after the first peripheral unit 401 has been read, for example. Alternatively, the signaling value can be indicated in another register R1+ by the first peripheral unit 401. When the second program in the example above has returned control to the first program, the first program can then see whether its check value, i.e. the content of the second output register 407, has been read by an interrupter. In the example of the random number generator, the first program could then request a new random number by reading the first output register 406 once again (and then also the check value from the second output register 407 again). In the case of this approach, the second program has, by reading the second output register 407, not obtained any information concerning what random number the first program is using. This prevents a task from being spied out by another task in the case of the first peripheral unit as a shared resource of the two tasks.

A further example, in which the additional mechanism described above is not used to protect the integrity and confidentiality of the data (as in the example above, in which the first peripheral unit 401 is a random number generator) but rather only to achieve integrity protection, is described below.

In this example, it is assumed that the first peripheral unit 401 is a memory that stores data in the form of a stack and that the reading of the first output register 406 is reading of the stack. Reading of the output register 406 therefore fetches and removes the topmost element of the stack, so that the next reading involves the next element of the stack being read. Firstly, the redundancy of the information in the first output register 406 and the second output register 407 ensures the integrity of the respective data value (e.g. against physical attacks), and secondly, the integrity of the access operations is ensured: this is because if an unauthorized second program reads from the first output register 406 or the second output register 407 (e.g. in the course of an interrupt) during the execution of a first program that works with the stack, the first program can recognize this because the check value that is read from the second output register 406 now does not match the data value that is read from the first output register 406 (for example is not identical thereto or does not correspond thereto according to the transformation or hash function) or because the other register contains the signaling value.

According to an embodiment, a unique sequence identifier (nonce, N) is used to enhance protection by virtue of the check value that is calculated in the second output register 407 for a value that is to be output by means of the first output register 406 on the basis of the value that is to be output and the sequence identifier N. By way of example, for each new value that is to be output, an as yet hitherto unused sequence identifier is used (e.g. by simply increasing a counter (N, N+1, N+2, etc.) and using it as a sequence identifier).

In an embodiment in which a sequence identifier is used in this way, instead of setting the second output register 407 to a constant signal value after the check value has been read therefrom, it is possible for the second output register 407 to be set to a signal value that is dependent on the sequence identifier. For this, it is possible for a first program to identify whether a second program has effected access that has altered (or compromised) the integrity of the state.

The text below describes, in the form of a pseudo code, an example of execution according to which the CPU 403 reads a value from the first peripheral unit 401:

| | |
|---|---|
| Load A1, PER_R1 | [Read value R1 into CPU register A1] |
| Load A2, PER_R1* | [Read check value R1* into CPU Register A2] |
| Move A3, T(A1) | [Calculate transformation T, store result in A3] |
| Cmp A2,A3 | [Check whether A2 = T(A1)] |
| JmpEqual Proc1 | [If so, go to Proc1, process value R1] |
| Cmp A2, SIG | [If not, check whether R1* is the signal value] |
| JmpEqual Proc2 | [If so, go to Proc2, value removed] |
| Alarm: | [If not, assume attack] |
| ... | |
| Proc1: | [Check value R1* matches, process value R1] |
| ... | |
| Proc2: | [Value R1* has been fetched from another task] |
| ... | |

In summary, one or more of the following functionalities are provided according to various embodiments:

a) For each register from a plurality of registers Rk, k=1, 2, 3, etc. of a peripheral unit, a check register Rk* is provided.

b) The value that the peripheral unit stores in Rk* is calculated by a function Rk*=T(Rk) or Rk*=T(Rk,N), where Rk* and Rk each denote the respective register content. T is a transformation (reversible) or a one-way function (hash). Optionally, a unique identifier N (nonce) is included in the function.

c) The check register Rk* is automatically reset to a constant signal value SIG after being read (or written to).

d) If a nonce N is used in accordance with b), the check register Rk* is set to a variable signal value SIGN=f(N), which is dependent on the nonce, instead of to a constant signal value as in c).

e) Alternatively, the signal value SIG is set in a different register than Rk*, and furthermore the check register Rk* is optionally reset (i.e. its content erased).

f) The CPU (i.e. generally the component that reads the register contents) checks the register contents of Rk, Rk* (possibly using the signal value) in accordance with the pseudocode above.

The check on whether the check register (or possibly the other register used for this purpose) contains the signal value is carried out only in multitasking mode, for example, and if the peripheral unit is available to a plurality of tasks simultaneously (i.e. is a jointly used peripheral unit (shared peripheral)).

The transformation T may be reversible (e.g. bit complement) if calculation of the data of the register content of Rk* back from Rk when identifying the signal value is not critical (e.g. in the case of random numbers, the data item is rejected and a new data item is generated, so that it is not critical if another task is able to ascertain the original data item).

In the case of an irreversible transformation, the data item cannot be calculated directly, but the repeated occurrence of the same data item could be identified (namely when the same value Rk* occurs repeatedly).

Various embodiments will be described in the following:

1. A data processing arrangement, comprising:
   a first data processing component and a second data processing component that are connected by means of a communication link;
   wherein the first data processing component comprises:
      a first data output memory element and a second data output memory element; and
      a control device that is set up to use the first data output memory element to store a value that is to be output and to use the second data output memory element to store a value that is based according to a prescribed function on the value that is to be output, wherein the control device is set up to store a new value that is to be output in the first data output memory element whenever the second data processing component has read a value to be output that is stored in the first data output memory element;
   and wherein the second data processing component comprises:
      a reading device that is set up to read the value stored in the first data output memory element and the value stored in the second data output memory element by means of the communication link;
      a processing device that is set up to check whether the value read from the second data output memory element is based according to the prescribed function on the value read from the first data output memory element and, depending on whether the value read from the second data output memory element is based according to the prescribed function on the value read from the first data output memory element, to process the value read from the first data output memory element.
2. The data processing arrangement of clause 1, wherein the function is the identity.
3. The data processing arrangement of clause 1, wherein the function is a reversible transformation.
4. The data processing arrangement of clause 1, wherein the function is a hash function.
5. The data processing arrangement of clause 3, wherein the prescribed function is dependent on a nonce.
6. The data processing arrangement of clause 1, wherein the processing device is set up to reject the value read from the first data output memory element if the value read from the second data output memory element is not based according to the prescribed function on the value read from the first data output memory element.
7. The data processing arrangement of clause 1, wherein the reading device is set up to read a new value from the first data processing element if the value read from the second data output memory element is not based according to the prescribed function on the value read from the first data output memory element.
8. The data processing arrangement of clause 1, wherein the control device is set up to store a prescribed signal value in the second data output memory element when the value stored in the second data output memory element has been read.
9. The data processing arrangement of clause 8, wherein the prescribed signal value is independent of the value that is to be output.
10. The data processing arrangement of clause 1, wherein the control device is set up to store a prescribed signal value in a further data output memory element when the value stored in the second data output memory element has been read, wherein the reading device is set up to read the value stored in the further data output memory element; and
    wherein the processing device is set up to check whether the further data output memory element stores the prescribed signal value and, depending on whether the further data output memory element stores the prescribed signal value, to process the value read from the first data output memory element.
11. The data processing arrangement of clause 10, wherein the prescribed signal value is independent of the value that is to be output.
12. The data processing arrangement of clause 10, wherein the processing device is set up to reject the value read from the first data output memory element if the further data output memory element stores the prescribed signal value.
13. The data processing arrangement of clause 1, wherein the first data processing component is a central processing unit.
14. The data processing arrangement of clause 1, wherein the second data processing component is a peripheral unit.
15. The data processing arrangement of clause 1, wherein the second data processing component is a random number generator.
16. The data processing arrangement of clause 1, being arranged in a security controller.
17. The data processing arrangement of clause 1, wherein the data output memory elements are output registers.
18. The data processing arrangement of clause 1, wherein the communication link is a bus.
19. The data processing arrangement of clause 1, wherein the communication link has an address bus and a data bus.
20. A method for data processing, the method comprising:
    storing a value that is to be output in a first data output memory element of a first data processing component;
    storing, in a second data output memory element of the first data processing component, a value based according to a prescribed function on the value that is to be output;
    wherein the first data processing arrangement stores a new value that is to be output in the first data output memory element whenever a second data processing component has read a value to be output that is stored in the first data output memory element;
reading the value stored in the first data output memory element and the value stored in the second data output memory element by the second data processing component;
checking whether the value read from the second data output memory element is based according to the prescribed function on the value read from the first data output memory element, and
processing the value read from the first data output memory element depending on whether the value read from the second data output memory element is based according to the prescribed function on the value read from the first data output memory element.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A data processing arrangement, comprising:
a first data processing component and a second data processing component that are connected by means of a communication link;
wherein the first data processing component comprises:
a first data output memory element and a second data output memory element; and
a control device that is set up to use the first data output memory element to store a value that is to be output and to use the second data output memory element to store a value that is based according to a prescribed function on the value that is to be output, wherein the control device is set up to store a new value that is to be output in the first data output memory element whenever the second data processing component has read a value to be output that is stored in the first data output memory element;
and wherein the second data processing component comprises:
a reading device that is set up to read the value stored in the first data output memory element and the value stored in the second data output memory element by means of the communication link;
a processing device that is set up to check whether the value read from the second data output memory element is based according to the prescribed function on the value read from the first data output memory element and, depending on whether the value read from the second data output memory element is based according to the prescribed function on the value read from the first data output memory element, to process the value read from the first data output memory element;
wherein the control device is set up to store a prescribed signal value when the value stored in the second data output memory element has been read, wherein the reading device is set up to read the stored value; and
wherein the processing device is set up to check whether the prescribed signal value is stored and, depending on whether the prescribed signal value is stored, to process the value read from the first data output memory element.

2. The data processing arrangement of claim 1, wherein the function is the identity.

3. The data processing arrangement of claim 1, wherein the function is a reversible transformation.

4. The data processing arrangement of claim 1, wherein the function is a hash function.

5. The data processing arrangement of claim 3, wherein the prescribed function is dependent on a nonce.

6. The data processing arrangement of claim 1, wherein the processing device is set up to reject the value read from the first data output memory element if the value read from the second data output memory element is not based according to the prescribed function on the value read from the first data output memory element.

7. The data processing arrangement of claim 1, wherein the reading device is set up to read a new value from the first data processing element if the value read from the second data output memory element is not based according to the prescribed function on the value read from the first data output memory element.

8. The data processing arrangement of claim 1, wherein the control device is set up to store the prescribed signal value in the second data output memory element when the value stored in the second data output memory element has been read.

9. The data processing arrangement of claim 8, wherein the prescribed signal value is independent of the value that is to be output.

10. The data processing arrangement of claim 1, wherein the processing device is set up to reject the value read from the first data output memory element if the further data output memory element stores the prescribed signal value.

11. The data processing arrangement of claim 1, wherein the first data processing component is a central processing unit.

12. The data processing arrangement of claim 1, wherein the second data processing component is a peripheral unit.

13. The data processing arrangement of claim 1, wherein the second data processing component is a random number generator.

14. The data processing arrangement of claim 1, being arranged in a security controller.

15. The data processing arrangement of claim 1, wherein the data output memory elements are output registers.

16. The data processing arrangement of claim 1, wherein the communication link is a bus.

17. The data processing arrangement of claim 1, wherein the communication link has an address bus and a data bus.

18. A method for data processing, the method comprising:
storing a value that is to be output in a first data output memory element of a first data processing component;
storing, in a second data output memory element of the first data processing component, a value based according to a prescribed function on the value that is to be output;
wherein the first data processing arrangement stores a new value that is to be output in the first data output memory element whenever a second data processing component has read a value to be output that is stored in the first data output memory element;

reading the value stored in the first data output memory element and the value stored in the second data output memory element by the second data processing component;

checking whether the value read from the second data output memory element is based according to the prescribed function on the value read from the first data output memory element;

processing the value read from the first data output memory element depending on whether the value read from the second data output memory element is based according to the prescribed function on the value read from the first data output memory element;

storing a prescribed signal value when the value stored in the second data output memory element has been read;

reading the stored value;

checking whether the prescribed signal value is stored; and depending on whether the prescribed signal value is stored, processing the value read from the first data output memory element.

* * * * *